(12) United States Patent
Epps

(10) Patent No.: US 12,006,171 B1
(45) Date of Patent: Jun. 11, 2024

(54) LOAD LIFTING SYSTEM AND METHOD

(71) Applicant: Charles Epps, Mullica Hill, NJ (US)

(72) Inventor: Charles Epps, Mullica Hill, NJ (US)

( * ) Notice: Subject to any disclaimer, the term of this patent is extended or adjusted under 35 U.S.C. 154(b) by 99 days.

(21) Appl. No.: 17/522,852

(22) Filed: Nov. 9, 2021

Related U.S. Application Data

(60) Provisional application No. 63/111,440, filed on Nov. 9, 2020.

(51) Int. Cl.
*B65G 7/12* (2006.01)

(52) U.S. Cl.
CPC ...................... *B65G 7/12* (2013.01)

(58) Field of Classification Search
CPC ............ B65G 7/12; A47C 31/08; A45C 13/30
USPC .................................... 294/15, 150; 224/157
See application file for complete search history.

(56) References Cited

U.S. PATENT DOCUMENTS

| | | | |
|---|---|---|---|
| 722,456 A * | 3/1903 | Reeves | |
| 2,508,795 A | 5/1950 | Nielsen | |
| 4,742,587 A * | 5/1988 | Dove ...................... | A61G 1/00 5/112 |
| 5,102,178 A | 4/1992 | Staats, Jr. | |
| 5,442,821 A | 8/1995 | Weeks | |
| 5,590,775 A * | 1/1997 | Moore ................... | B65D 65/08 47/84 |
| 5,598,592 A * | 2/1997 | Castellani .............. | A61G 1/013 5/625 |
| 5,839,137 A * | 11/1998 | Butler ..................... | A61G 1/01 5/89.1 |
| 6,193,293 B1 | 2/2001 | Ybanez | |
| 6,508,389 B1 | 1/2003 | Ripoyla et al. | |
| 6,908,131 B2 | 6/2005 | Main et al. | |
| 7,331,493 B2 | 2/2008 | Dent, III | |
| 8,459,710 B1 * | 6/2013 | White ..................... | B65G 7/12 294/152 |
| 9,681,738 B1 * | 6/2017 | Herrera ................. | A45C 13/30 |
| 9,930,955 B2 | 4/2018 | Nielsen | |
| 10,427,874 B1 * | 10/2019 | Hurd ...................... | B65D 85/68 |
| 2003/0201655 A1 * | 10/2003 | Zellmer ................ | A63B 47/00 294/150 |
| 2005/0103813 A1 | 5/2005 | Edwards | |
| 2009/0140019 A1 | 6/2009 | Martinich | |
| 2010/0140970 A1 | 6/2010 | Vrynois | |

FOREIGN PATENT DOCUMENTS

TW         200930649         7/2009

* cited by examiner

*Primary Examiner* — Dean J Kramer
(74) *Attorney, Agent, or Firm* — John Rizvi; John Rizvi, P.A—The Patent Professor®

(57) ABSTRACT

A load lifting system and method allows for safely and securely maneuvering a piece of furniture or other load, regardless of the orientation of the furniture or load relative to the ground. The load lifting system generally includes one or more load lifting devices, each load lifting device including a support structure for engaging the piece of furniture and a retention strap affixed to the support structure and having a releasable buckle or other fastener for securing the support structure to the piece of furniture or load. The support structure may be preformed into a box like shape defining a pocket for receipt of the piece of furniture. A plurality of handles are provided on the support structure and may include differently-oriented handles facilitating manual maneuvering and rotating of the load during lifting and transportation.

23 Claims, 6 Drawing Sheets

LOAD LIFTING SYSTEM AND METHOD

CROSS-REFERENCE TO RELATED APPLICATION

This application claims the benefit of U.S. Provisional Patent Application No. 63/111,440, filed on Nov. 9, 2020, which is incorporated by reference herein in its entirety.

FIELD OF THE INVENTION

The present invention relates generally to furniture moving devices, and more particularly, to an apparatus and method of manually lifting and carrying furniture or other loads in a safe and efficient manner.

BACKGROUND OF THE INVENTION

Moving valuable furniture is often a difficult and even traumatic experience for many people. The furniture typically has to be taken off of, and handed down from, a transport vehicle and then maneuvered into a house or apartment or the like. The furniture may have to be moved through doors, up or down open or enclosed stairs or stair wells and even over other furniture or half walls.

During the moving of the furniture, the furniture is subject to damage. The furniture may hit a door or wall or may inadvertently be dropped on the ground or floor. Damage in the form of scratches, dents and even broken pieces are too often typical during the moving of the furniture. Valuable pieces of furniture are rendered less valuable and treasured heirlooms damaged or destroyed entirely. This loss of value, either economic or emotional, during the movement of the furniture is undesirable.

Additionally, and perhaps more importantly, the furniture itself often does not provide any easy or convenient places for a mover to grasp the furniture. Should the furniture slip or the mover lose his grasp, injury to the mover may occur. For example, handles located on movable drawers could pull out at inopportune moments resulting in the furniture coming apart and falling on the mover. The furniture may fall on a movers foot or leg resulting in serious injury. Moreover, the lack of secure grasping surfaces on the furniture may result in the user or mover having to suddenly re-grasp the furniture, resulting in back, arm, neck or other muscle strain, sprains and other soft tissue injuries.

Various mechanisms have been developed over the years in an attempt to assist in the safe and efficient movement of furniture. Strap or sling mechanisms may be provided to support the furniture, but are often simply slung under the furniture rendering the furniture vulnerable to damage should the furniture have to be manipulated to different orientations. Additionally, the typical moving straps or slings require the user to set the furniture down and reposition the straps if the furniture has to be changed in orientation in order to pass through a door, up or down stair wells or even turned end on end to be moved through an areas.

Accordingly, there is need for a solution to at least one of the aforementioned problems. For instance, there is an established need for a solution for safely supporting and carrying a piece of furniture on all sides and regardless of its orientation relative to the ground or a worker.

SUMMARY OF THE INVENTION

The present invention is directed to a load lifting system and method for safely and securely maneuvering a piece of furniture or other load, regardless of the orientation of the furniture or load relative to the ground or to a mover. The load lifting system generally includes at least one load lifting device comprising a support structure for engaging the piece of furniture or load, and a retention strap affixed to the support structure and having a releasable buckle or fastener for securing the support structure to the load. The support structure may be preformed into a box like shape defining a pocket for receipt of the piece of furniture. A plurality of handles may be provided on the support structure and may include differently-oriented handles.

In a first implementation of the invention, a load lifting system for safely and securely moving a load comprises at least one load lifting device. Each load lifting device may include a flexible, support structure defining an interior space, and one or more handles affixed to the support structure. Each load lifting device may further include a flexible, retention strap attached to the support structure, the retention strap arrangeable to form a loop. Each load lifting device may further include at least one fastener. Each load lifting device may form an open-ended pocket configured to receive a load therein, the open-ended pocket comprising the interior space of the support structure. The load lifting system may be configured to adopt a working configuration in which a load is received within the open-ended pocket formed by each load lifting device of the at least one load lifting device, and further in which the retention strap of each load lifting device is tightened against the load, and the at least one fastener of each load lifting device maintains the retention strap of each load lifting device tightened against the load.

In a second aspect, the at least one load lifting device may include two load lifting devices, configured to receive different portions of a load.

In another aspect, the two load lifting devices may be a mirror of each other. In the working configuration of the load lifting system, with the two load lifting devices mounted on different portions of the load, the at least one fastener of one of the load lifting devices and the at least one fastener of the other load lifting device may be oriented in a same direction.

In another aspect, the retention strap may include a first end and a free end. The at least one fastener may include a releasable buckle affixed to the first end of the retention strap and engageable with the free end of the retention strap to cinch the retention strap tight around the load.

In another aspect, the support structure may include a mesh.

In yet another aspect, the support structure may be formed as an open-ended body comprising an opening configured to receive the load therethrough to fit the open-ended body over the load and receive the load in the interior space. The retention strap may be located at and along an edge of the open-ended body which defines the opening.

In another aspect, the one or more handles may be located on an end side of the open-ended body located opposite to the opening.

In another aspect, the open-ended body may be formed as a flexible box and may further include a top side extending from the end side, a bottom side extending from the end side oppositely to the top side, a first side extending from the end side between the top and bottom sides, and a second side extending from the end side between the top and bottom sides and oppositely to the first side. The edge may be defined by the top side, first side, bottom side and second side of the open-ended body.

In another aspect, at least one of the top side, bottom side, first side and second side of the open-ended body may include a mesh.

In yet another aspect, the top side, bottom side, first side and second side of the open-ended body may be formed of a mesh.

In another aspect, the one or more handles may include a plurality of handles arranged in at least two different orientations.

In another aspect, the plurality of handles may include a first handle subset consisting of one or more handles arranged in a first orientation, and a second handle subset consisting of one or more handles arranged in a second orientation perpendicular to the first orientation.

In another aspect, the plurality of handles may farther include a third handle subset consisting of one or more handles arranged in the first orientation. The second handle subset may be arranged between the first handle subset and the third handle subset.

In yet another aspect, the first, second and third handle subsets may be located on an end side of the open-ended body located opposite to the opening.

In another aspect, the second handle subset may be located at an intermediate area of the end side of the open-ended body.

In another aspect, the first handle subset may be located at a first edge area of the end side of the open-ended body.

In another aspect, the third handle subset may be located at a second edge area of the end side of the open-ended body located opposite the first edge area.

In yet another aspect, in the working configuration of the load lifting system, the support structure may be tightened against the load.

In another implementation of the invention, a load lifting system for safely and securely moving a piece of furniture positioned in various orientations is provided, the load lifting system comprising:
  a support structure formed into an open ended box defining a pocket for receipt of a piece of furniture, the support structure including an end side, a top side, a bottom side and first and second sides;
  a retention strap at least partially affixed to one or more of said top, bottom, first and/or second sides of said support structure, said retention strap having a first end and a free end; and
  a releasable buckle affixed to said first end of said retention strap and engagable with said free end of said retention strap to cinch said support structure tight around a piece of furniture.

In a second aspect, the load lifting device further includes a plurality of handles provided on the support structure.

In another aspect, the plurality of handles includes a plurality of vertical handles and a plurality of horizontal handles.

In another aspect, there is disclosed a method of safely and easily moving a load, the method comprising;
  providing a web of material having an end side, a top side, a bottom side and first and second sides, a retention strap having a first end and a free end and a releasable buckle affixed to said first end of said retention strap, said retention strap being at least partially affixed to said web of material and a plurality of handles provided on said web of material;
  positioning the web of material around an end of a piece of furniture such that said end side of said web of material engages the end surface of the piece of furniture and said top side, bottom side and first and second sides engage and support a top surface, a bottom surface, a front surface and a rear surface of the piece of furniture;
  tightening said retention strap about the piece of furniture by drawing said free end of said retention strap through said releasable buckle; and
  grasping said plurality of handles to lift the piece of furniture.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit, the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention is directed toward a system and method for lifting a piece of furniture or other load. The system can be removably attached to the piece of furniture or other load and provide a safe and ergonomic structure for one or more workers to lift and move the piece of furniture or load.

Figure 1:
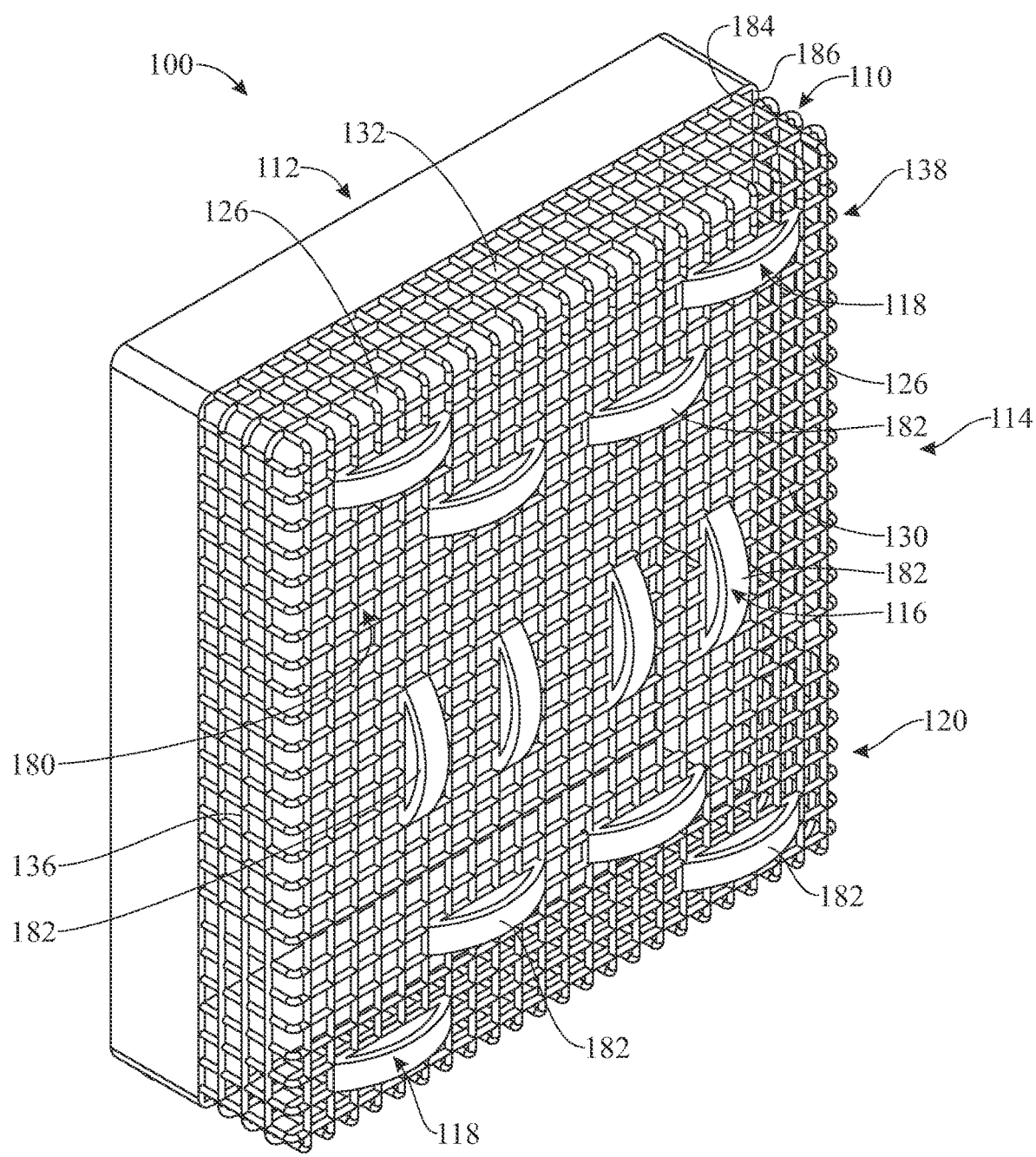
FIG. 1 presents a top, rear isometric view of a load lifting device of a load lifting system in accordance with an exemplary, illustrative embodiment of the present invention.
Figure 2:
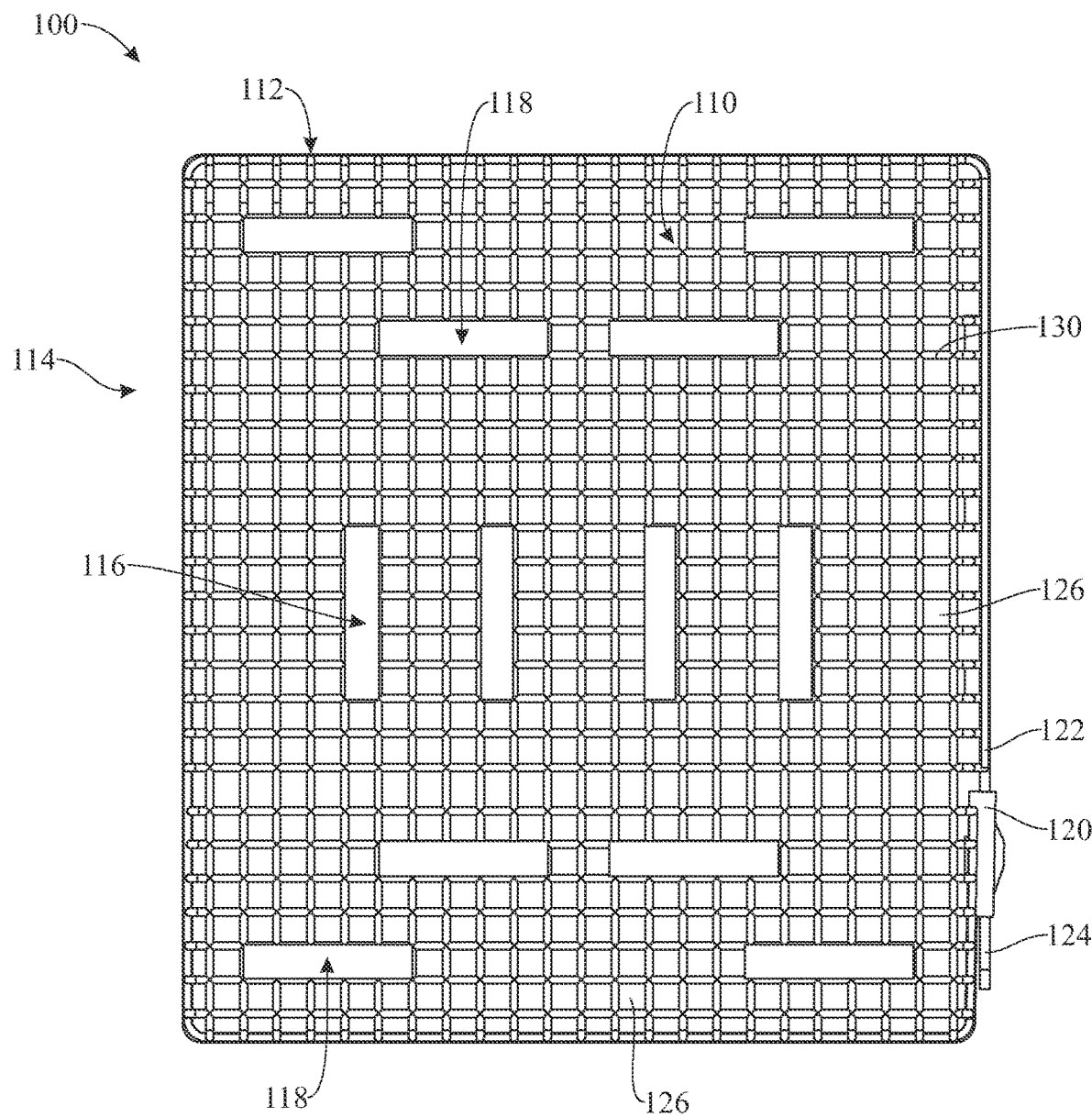
FIG. 2 presents a rear elevation view of the load lifting device of FIG. 1.

The load lifting system of the present disclosure comprises at least one, and more preferably, at least two load lifting devices configured to be secured to the piece of furniture or load and facilitate lifting and transporting the load. Referring initially to FIGS. 1 and 2, a load lifting device 100 of a load lifting system is illustrated in accordance with an exemplary embodiment of the present invention. The disclosed load lifting device 100 generally includes a support structure 110 and a retention strap 112 associated with the support structure 110 and provided to secure the support structure 110 around a piece of furniture to be lifted or moved without damage to the piece of furniture or injury to the users of the load lifting system.

As further shown, the load lifting device 100 further includes a plurality of handles 114 attached to the support structure 110 and extending outward therefrom. The handles 114 allow the users of the load lifting system to easily and ergonomically grasp and lift the piece of furniture with the load lifting system. The plurality of handles 114 may have various shapes and orientations on the support structure 110. For example, in this particular embodiment, the plurality of handles 114 includes a first plurality of handles 116 arranged in a first orientation, and a second plurality of handles 118 oriented generally perpendicular to the first plurality of handles 116. For example, in FIG. 1, the handles 116 are vertically arranged, while the handles 118 are horizontally arranged. The provision of the first and second plurality of handles 116 and 118, respectively, gives one or more users the option of grasping the load lifting device 100 from various directions and a differing points as the furniture is lifted and moved as discussed in more detail hereinbelow. This ability to grasp the disclosed load lifting device 100 at differing points is particularly important where furniture needs to be shifted, lifted or rotated to manipulate the furniture around objects in the path of movement and/or maneuver the furniture through doors, window, and other openings which would require the users to shift their hands on the furniture; to obtain better and more secure grasps as the furniture is lifted, moved manipulated and/or maneuvered.

The plurality of handles 114, including the plurality of vertical handles 116 and the plurality of horizontal handles 118 may have various shapes and sizes. In this particular embodiment, the plurality of handles 114 have a half-moon, semi-circular, arched or otherwise outwardly-curved shape extending outward from the support structure 110. Alternatively, the plurality of handles 114 may include differing shapes such as, but not limited to, oval, rectangular, outwardly extending shafts or similar projections, etc. Further, the plurality of handles 114 may include various depressions, surface texturing such as, but not limited to, surface nubs or roughened faces, etc. to enhance the friction with the hand of the users to provide a more secure grasp of the plurality of handles. Still further, the sizes and shapes between the vertical handles 116 and the horizontal handles 118 may differ or differ within the vertical and horizontal handles 116 and 118, respectively, themselves.

In some embodiments, such as the present embodiment, the plurality of handles 114 are arranged such that the horizontal handles 118 are located at a top area and a bottom area of the support structure 110, and more particularly, at a top area and a bottom area of the end side 130 of the support structure 110. The vertical handles 116 are arranged at an intermediate or central area of the support structure 110, and more particularly, at an intermediate or central area of the end side 130 of the support structure 110. The vertical handles 116 may be arranged in parallel, aligned relationship with one another, as shown. The horizontal handles 118 may be arranged at varying distances from the central area of the support structure 110 at which the vertical handles 116 are located, as shown.

It should be noted that, while the disclosed plurality of handles 114 are shown at particular orientations on the support structure 110, i.e., horizontal and vertical, other uniform or random orientations on the support structure 110 are also within the contemplated scope of the present invention. Further, while not specifically shown, some or all of the plurality of handles 114 may be provided on other locations on the support structure 110 or even on the retention strap 112 as discussed in more detail herein below.

Figure 3:
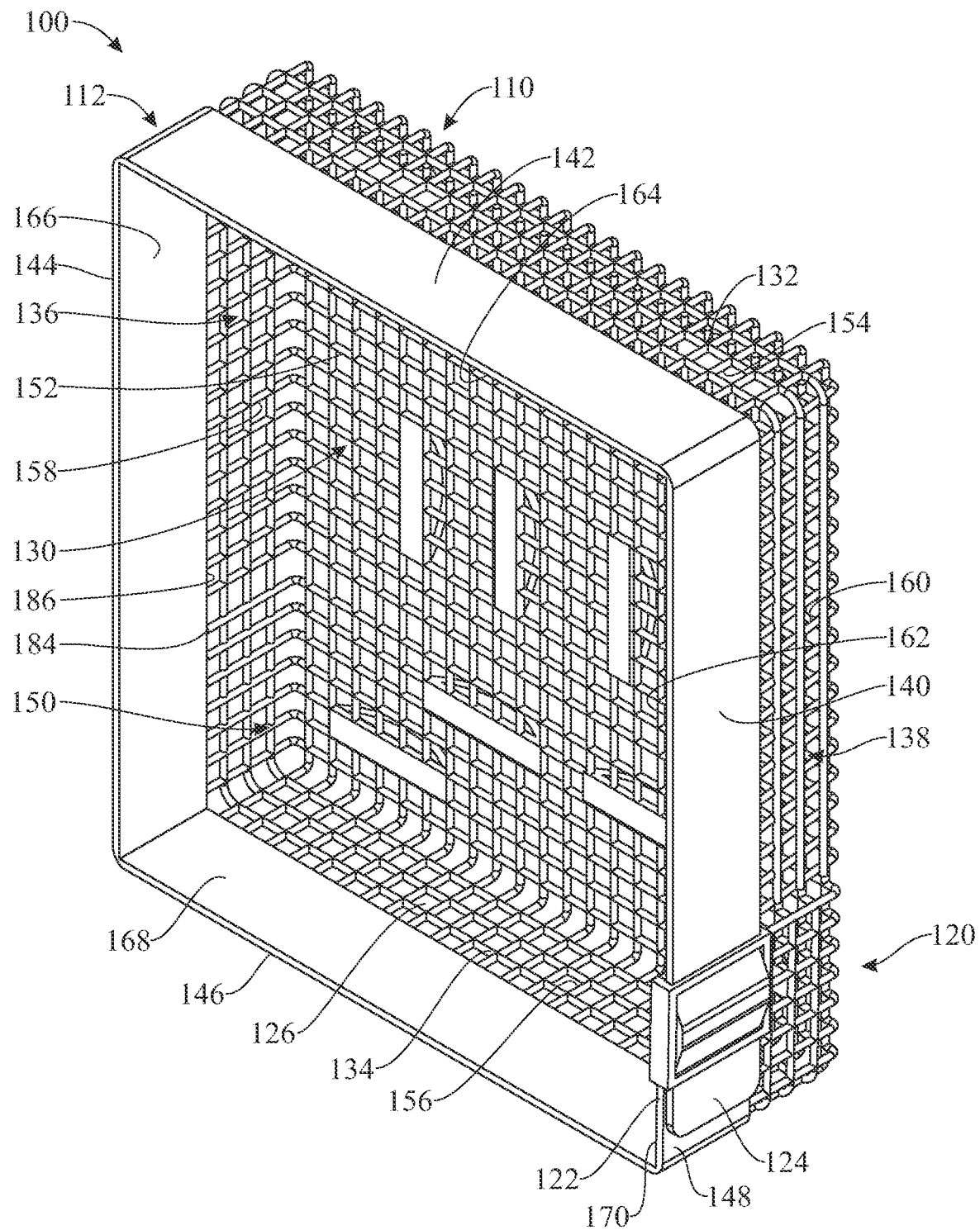
FIG. 3 presents a top, front isometric view of a second load lifting device which is a mirror image of the load lifting device of FIGS. 1 and 2.

As best shown in FIG. 3, in order to secure the support structure 110 about a piece of furniture, the retention strap 112 includes a releasable buckle 120 attached to a first end 122 of the retention strap 112. The releasable buckle 120 is designed to releasably receive and secure a free end 124 of the retention strap 112. The buckle 120 and retention strap 112 attachment allows the retention strap 112 to be cinched tight against the support structure 110, and thus about the piece of furniture enclosed or supported by the support structure 110, as discussed in more detail hereinbelow.

The disclosed releasable buckle 120 is illustrated as a type of buckle 120 wherein the free end 124 of the retention strap 112 passes through the releasable buckle 120 and is secured therein by friction. However, other type of releasable buckles 120 may be provided. For example, dress belt type buckles 120 may be included, wherein the buckle includes a pin and the free end 122 of the retention strap 112 has multiple holes to receive the pin at various locations to provided adjustments in the length of the retention strap 112 about the support structure 110. Further, the releasable buckle 120 may take the form of other end to end strap type fasteners such as, but not limited to, snap fit or click to close type releasable connections with strap length adjustment features, etc.

In the disclosed embodiments, the materials of construction for the support structure 110 may include natural and/or synthetic materials which render the support structure 110 generally non-stretchable and providing sufficient strength to support the furniture desired to be lifted, and sufficiently flexible to allow the support structure 110 to surround and support various shapes and sizes of furniture to be lifted. For example, the support structure 110 may be formed of a sturdy or heavy natural cotton or other cloth material including a heavy canvas type material. In another example, the material forming the support structure 110 may be synthetic, such as, but not limited to, various polymeric or other synthetic materials typically utilized in the formation of webs or web material and capable of being formed in large sheets of material. Further, the material forming the support structure 110 may be a relatively tight knit web or may be more of a mesh type web with openings, such as, but not limited to, openings 126 to reduce weight while maintaining strength of material.

Similarly, the retention strap 112 may also be formed from a similar variety of natural or synthetic materials. For example, the retention strap may be formed from a tough and strong cloth material providing a high degree of flexibility to the retention strap or even an animal based material such as for example, a leather material. Alternatively, the retention strap 112 may be formed of synthetic materials similar to those described hereinabove with regard to the support structure. It can be appreciated that, were the support structure 110 and the retention strap 112 of the load lifting device 100 are formed from the same material, the support structure 110 and the retention strap 112 may be formed wholly or partially integrally together.

The plurality of handles 114 may also be formed of synthetic materials such as those described herein above or may be formed from natural materials such as, but not limited to, various types of wood, etc Where the plurality of handles 114 are formed from the same material as the support structure 110, the plurality of handles 114 may be formed integrally with the support structure 110 by molding the plurality of handles 114 into the support structure 110. Alternatively, the plurality of handles 114 may be formed by die cutting or punching the plurality of handles 114 within the material of the support structure 110.

In non-limiting examples, the disclosed releasable buckle 120 may be formed from a strong metallic material such as, but not limited to, iron, brass or bronze, stainless steel, etc. or may be formed from a relatively rigid synthetic material.

Referring now to NG. 3, there is disclosed an alternative orientation of the load lifting device 100 which is formed and constructed identical to the first disclosed load lifting device 100 and is simply a mirror image of the first disclosed load lifting device 100, the only difference being the location of the releasable buckle 120 of the retention strap 112 on the support structure 110, which is now located on an opposite side of the load lifting device 100. The specific structure of the load lifting device 100 of FIGS. 1 and 2, and also FIG. 3, will now be described, with reference to FIG. 3. The flexible, support structure 110 of the present embodiment is formed as a generally open ended structure configured to fit over and wrap around a portion of a piece of furniture. The open ended structure may be box-like or box-shaped, and may include an end side 130, a top side 132 extending from the end side 130, a bottom side 134 extending from the end side 130 oppositely to the top side 132, a right or first side 136 extending from the end side 130 between the top and bottom sides 132 and 134, and a left or second side 138 extending from the end side 130 between the top and bottom sides 132 and 134 and oppositely to the top side 132. The retention strap 112 is formed as a length or belt of material extending along a second end or edge of the support structure 110 opposite the end side 130, and configured to tighten against the piece of furniture onto which the support structure 110 is fitted. For example, as shown, the retention strap 112 may include a first length or portion 140 extending from the buckle 120, a second length or portion 142 extending from the first portion 140, a third length or portion 144 extending from the second portion 142, a fourth length or portion 146 extending from the third portion 144, and a fifth length or portion 148 extending from the fourth portion 146 to the buckle 120. The first and fifth portions 140 and 148, respectively, may extend from and along the second side 138 of the support structure 110. In turn, the second, third, and fourth portions 142, 144, and 146 extend from and along the top side 132, first side 136, bottom side 134, respectively, of the support structure 110. Together the support structure 110 and the retention strap 112 of the load lifting device 100 define a pocket 150 fix receipt of an end of a piece of furniture as described in more detail hereinbelow. As noted hereinabove, the support structure 110 and the retention strap 112 may be wholly or partially integrally formed together.

With continued reference to FIG. 3, the end side 130 of the support structure 110 has an inner face 152. Likewise, the top side 132, the bottom side 134 and the first and second sides 1363 and 138 have respective inner faces 154, 156, 158 and 160 facing the pocket 150. Similarly, the first portion 140, the second portion 142, the third portion 144, the fourth portion 146 and the fifth portion 148 of the retention strap 112 have respective inner surfaces 162, 164, 166, 168 and 170 facing the pocket 150. As noted herein above, the releasable buckle 120 of the present embodiment is provided on the first end 122 of the retention strap 112 which is located on the fifth portion 148 of the retention strap 112. The first portion 140 of the retention strap 112 adjustably extends through the buckle 120, and the second free end 124 of the retention strap 112 is located on said first portion 140 of the retention strap 112.

Referring to FIGS. 1 and 3, and as noted above, the plurality of handles 114 are provided on the support structure 110. Specifically, in this particular embodiment, the plurality of handles 114 project outwardly from an outer face 180 of the support structure 110. The handles 114 may be formed as outwardly-protruding, semi-circular, arched or otherwise outwardly-curved projections 182. In this specific embodiment, the outwardly-curved projections 182 are formed by punching or molding the outwardly-curved projections 182 out of the end side 130 of the support structure 110.

While not specifically shown, the support structure 110 and the retention strap 112 may be formed separately or together. For example, the support structure 110 and the retention strap 112 may be formed separately and subsequently partially joined together along respective peripheral edges 184 and 186 by various known methods such as, but not limited to, gluing, welding, stitching, etc. Alternatively, the support structure 110 and the retention strap 112 may be integrally formed together along the respective peripheral edges 184 and 186. The first and fifth portions 140 and 148, respectively, of the retention strap may be separated from the support structure 110 so as to be free to cinch the support structure 110 and the retention strap tight around the furniture to be moved.

Figure 4:
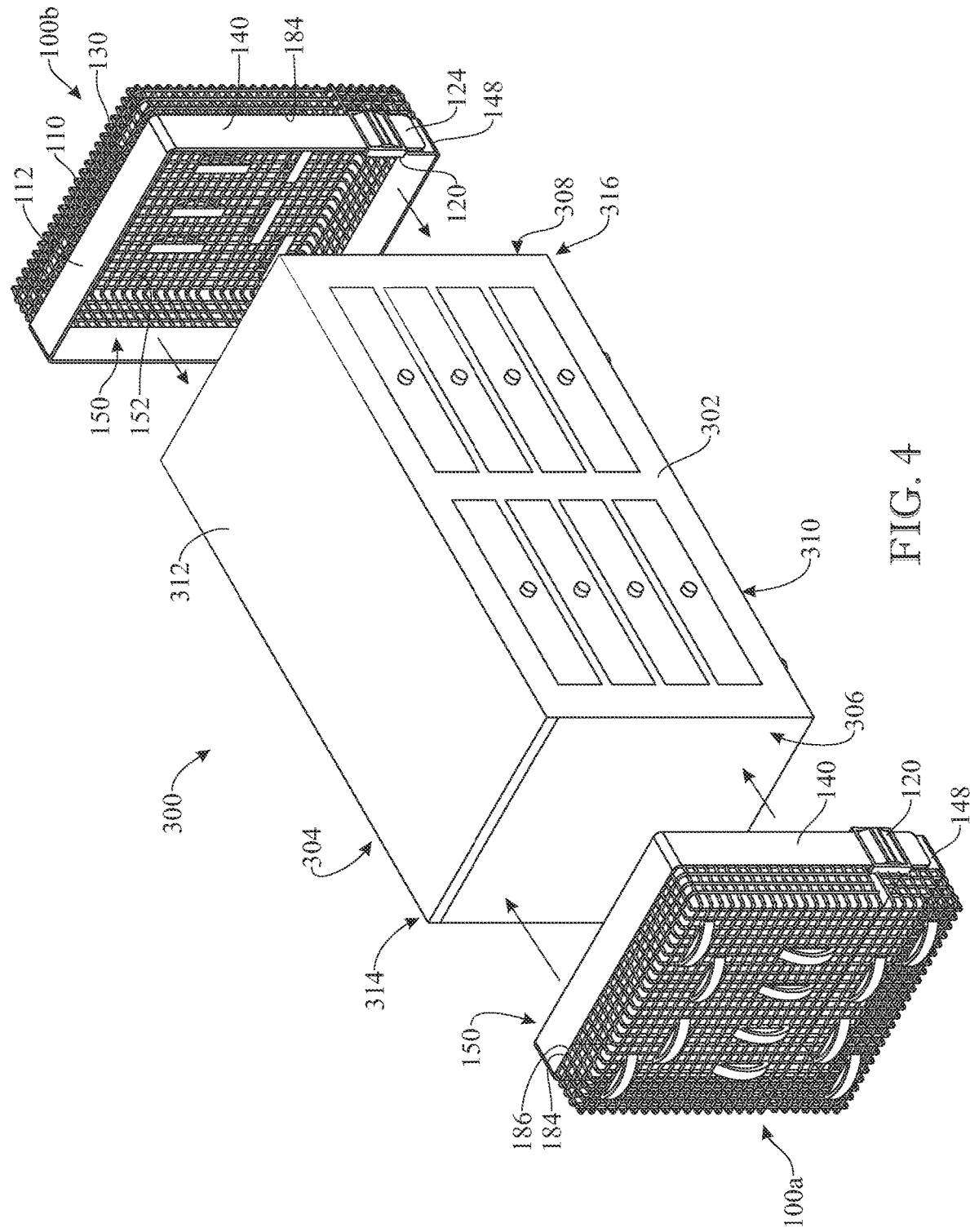
FIG. 4 presents a top isometric view of a pair of load lifting devices in accordance with the exemplary embodiment of the present invention in use prior to being attached to a piece of furniture.
Figure 5:
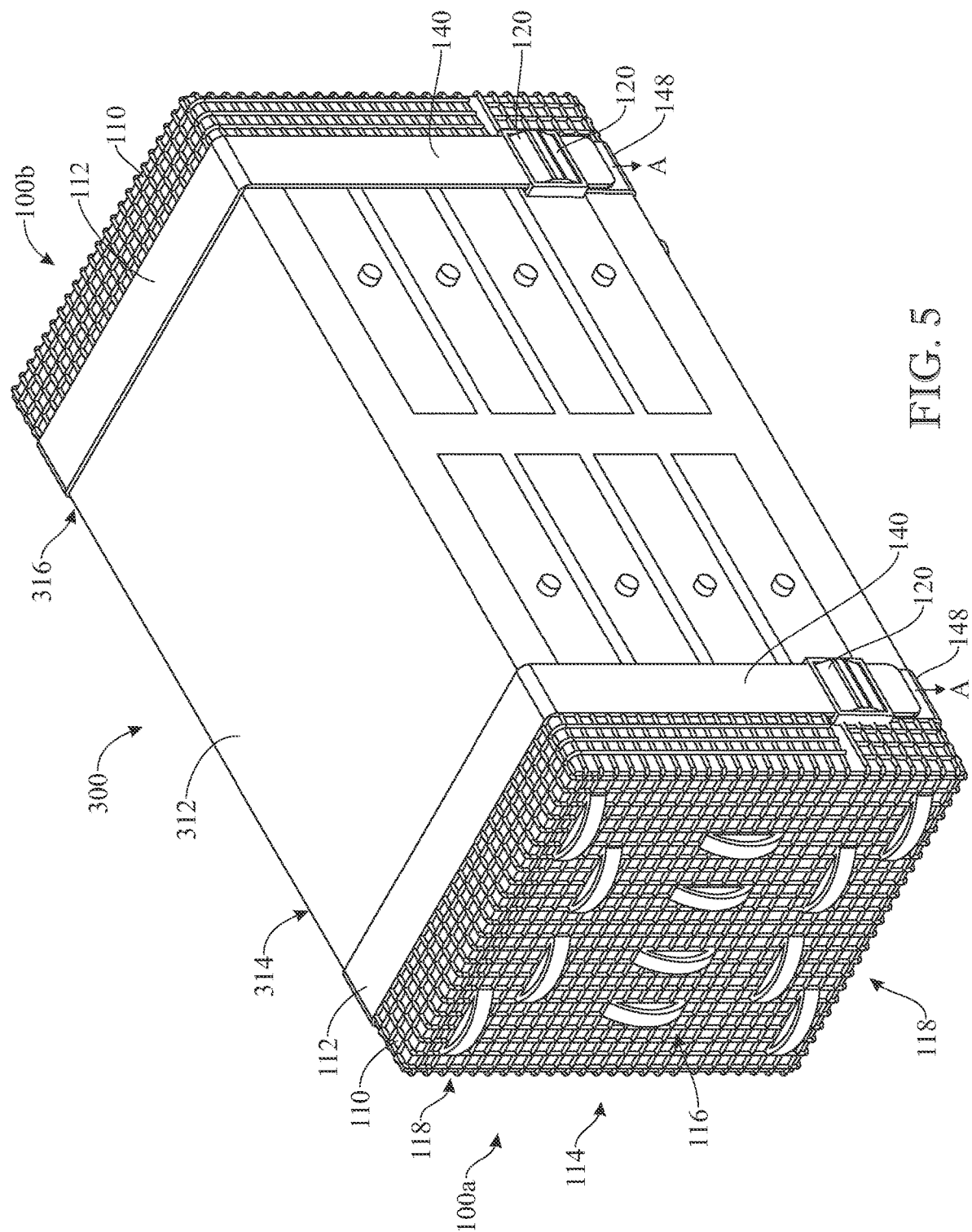
FIG. 5 presents a top isometric view of the pair of load lifting devices in accordance with the exemplary embodiment of the present invention attached to the piece of furniture.
Figure 6:
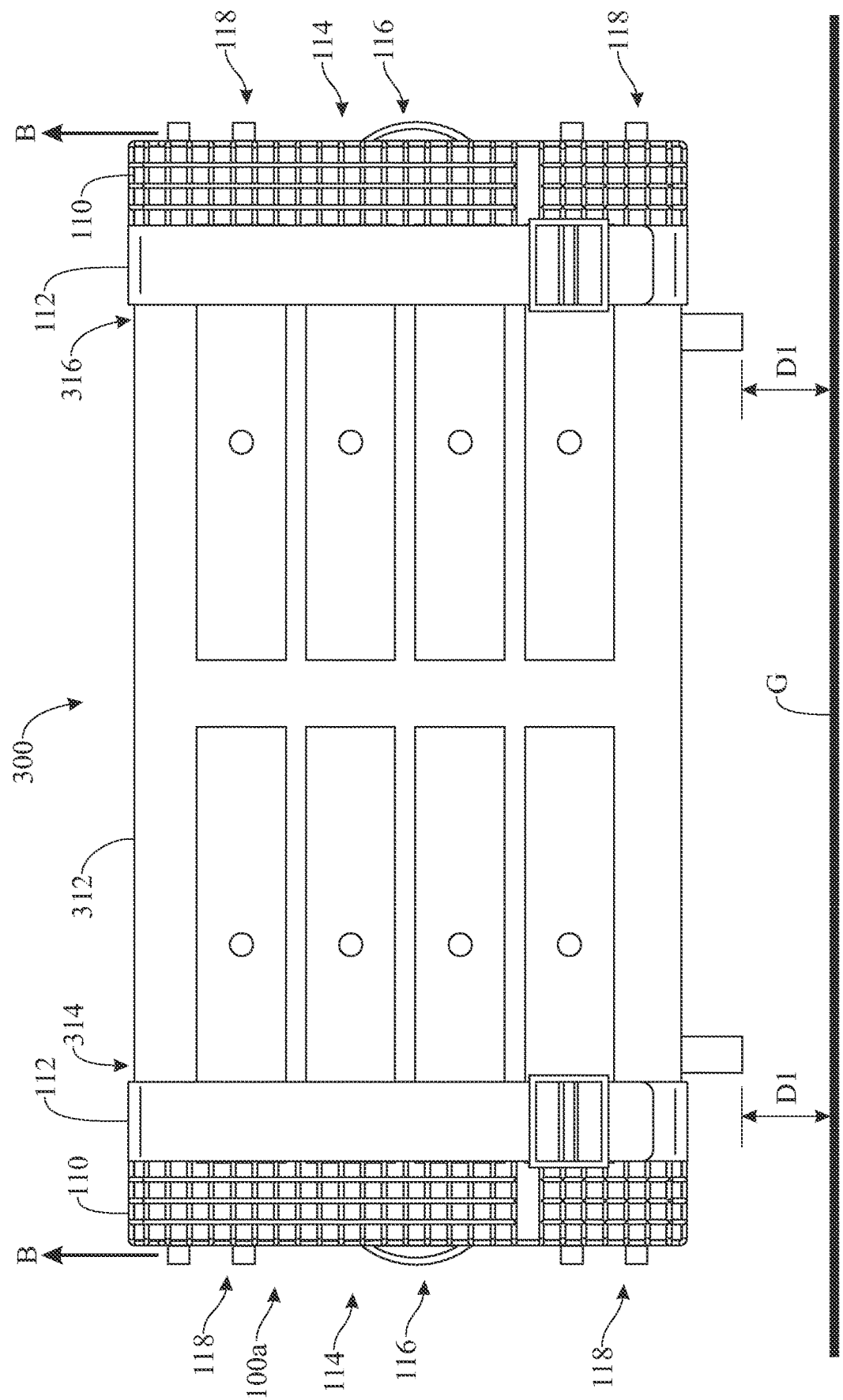
FIG. 6 presents a side elevation view of the pair of load lifting devices of FIG. 4 in use to lift the piece of furniture off the ground or floor.

Turning now to FIGS. 4-6, the use of the disclosed load lifting system to secure and lift a piece of furniture, for example, furniture 300, will now be described. The piece of furniture 300, in this illustrative example, is generally box shaped having a front side or surface 302, a rear side or surface 304, a first end side or surface 306, a second end side or surface 308, a bottom side or surface 310, and a top side or surface 312. As will be described hereinafter, different sides or surfaces may be supported by the load lifting devices 110 depending on how the furniture 300 is being carried.

As shown in FIGS. 4-6, two load lifting devices 100, specifically furniture lifting device 100a and furniture lifting device 100b, are showing being used to transport the piece of furniture 300. In a non-limiting example, the furniture lifting devices 100a, 100b are mirror images of each other differing only in where the placement of the first and fifth portions 140 and 148, respectively, and the releasable buckle 120 are located on the peripheral edge 184 of the support structure 110. The load lifting device 100a has the orientation or configuration of the load lifting device 100 illustrated in FIGS. 1 and 2 while the load lifting device 100b has the orientation or configuration of the load lifting device 100 as illustrated in FIG. 3. By using mirror-image furniture lifting devices 100a and 100b, the lifting devices 100a, 100b may be attached to opposite ends of the piece of furniture 300 with the respective buckles 120 oriented towards a same side of the piece of furniture 300 (e.g., frontward and generally adjacent to the front side or surface 302 of the piece of furniture 300, as shown).

As can be seen in FIG. 4, the piece of furniture 300 has a first end 306 and an opposite, second end 308 arranged on opposite ends of the front, rear, first end, second end, bottom, and top surfaces 302, 304, 306, 308, 310 and 312, respectively. The following description of attaching a load lifting device 100 to the piece of furniture 300 will be given with regard to the load lifting device 100b and the second end 316 of the piece of furniture 300. As noted, the load lifting device 100a of the present, illustrative application, is a mirror image of the load lifting device 100b and functions and is used identically to engage and support the opposing first end 314 of the piece of furniture 300.

Initially, the load lifting device 100b is prepared by loosening the second free end 124 of the retention strap 112 within the releasable buckle 120 to expand or enlarge the loop provided by the retention strap 112. This allows the retention strap 112, and subsequently the support structure 110, to fit over the second end 316 of the piece of furniture 300, to thus position the load lifting device 100b over the second end 316 of the piece of furniture 300. The load lifting device 100b is positioned over the second end 316 of the piece of furniture 300 until the second end 316 is positioned within the pocket 150 defined by the support structure 110 and the retention strap 112. Preferably, the piece of furniture 300 is inserted into the pocket 150 such that the second end surface 308 of the piece of furniture 300 is flush with or abuts against the inner face 152 of the end side 130 of the support structure 110 (FIG. 3). The load lifting device 100a is fitted over the opposite, first end 314 of the piece of furniture 300, thereby achieving the configuration of FIG. 5.

Thereafter, and with continued reference to the load lifting device 100b, the second free end 124 of the retention strap 112 of the load lifting device 100b is pulled tight through the releasable buckle 120 in the direction of arrows "A" shown in FIG. 5, to cinch the retention strap 112 and thus the support structure 110 tight around the second end 316 of the piece of furniture 300. The cinching of the load lifting device 100b tight about the second end 316 of the piece of furniture 300 firmly secures generally all of the inner surfaces 162, 164, 166, 168 and 170 of the retention strap 112 against the piece of furniture 300 so that the piece of furniture 300 can be lifted and moved without fear of the second end 316 of the piece of furniture 300 becoming unsupported as the piece of furniture 300 is moved. In this way, the piece of furniture 300 is fully supported by the load lifting device 100b without having to remove or even reposition the furniture support apparatus 100b if the piece of furniture 300 has to be maneuvered, such as turned upside down, as it is being moved.

In some embodiments, when cinching the retention strap 112 against the piece of furniture 300, at least one of the inner face 156 of the bottom side 134 of the support structure 110, the inner face 154 of the top side 132 of the support structure 110, the inner face 158 of the first side 136 of the support structure 110, and the inner face 152 of the end side 130 of the support structure 100 may be pressed onto or abut against the bottom surface 310, top surface 312, rear surface 304, and front surface 302 of the piece of furniture 300, respectively. In some embodiments, such as the present embodiment, all of the bottom side 134, top side 132, first side 136 and second side 138 compress onto or abut against the corresponding bottom surface 310, top surface 312, rear surface 304, and front surface 302 of the piece of furniture 300. Having all sides 130, 132, 134, 136, and 138 of the support structure 110 abut against the piece of furniture 300 when the piece of furniture 300 is fitted into the pocket 150 further immobilizes the piece of furniture 300 relative to the load lifting device 100b to facilitate transporting and maneuvering (e.g., rotating) the piece of furniture 300 via the load lifting device 100b.

It should be noted that the opposing furniture support apparatus 100a is attached to, engages and supports all the similar surfaces, including the first end surface 306, of the piece of furniture 300 to fully secure and support the first end 314 of the piece of furniture 300 in identical manner as that described hereinabove with regard to the furniture support apparatus 100b and the second end 316 of the piece of furniture 300.

Turning now to MG. 6, once the furniture support apparatus 100a and 100b have been secured around the first and second ends 314 and 316, respectively, of the piece of furniture 300, the furniture support apparatus 100a and 100b can be grasped by users at the plurality of handles 114, for example the plurality of horizontal handles 118, and lifted off the ground "G" a height DI in the direction of arrows "B" for manipulation and movement of the piece of furniture 300. Should the piece of furniture 300 need to be maneuvered or changed in orientation as it is carried, the plurality of vertical handles 116 alone or in combination with the plurality of horizontal handles 118 are available such that the piece of furniture can be moved without having to set the piece of furniture back down on the ground for a better or different grip or grasp by the users.

Once the piece of furniture 300 has been safely moved to the desired location, the second free ends 124 of the retention strap 112 can be released or loosened from within the releasable buckles 120 and the load lifting device 100a and 100b removed from the piece of furniture 300. While not specifically illustrated, other handles having differing orientations, such as, but not limited to, angled, arcuate, etc. may be provided on the support structure 110. Additionally, handles may also be provided on the retention strap 112 to provide more gripping surfaces on the load lifting device 100.

It should be noted that the disclosed load lifting device 100 supports the piece of furniture 300 being lifted on all disclosed surfaces such that the piece of furniture 300 can be manipulated and maneuvered including being turned on end, upside down, sideways and at various angles without having to remove or even reposition the load lifting device 100 after it has been secured to the piece of furniture 300. This provides a great time saving and ease of use device for moving furniture 300 especially in situations where the furniture has to be maneuvered through, over or around something with no room or time to remove and reposition the lifting device used.

Furthermore, because the retention strap 112, and preferably also the support structure 110, are made from flexible materials, the load lifting device 100 may adjust to furniture items of different shape and/or size, therefore providing a versatile and virtually universal furniture transportation tool.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A load lifting system for safely and securely moving a load, the load lifting system comprising:
at least one load lifting device, each load lifting device comprising:
a flexible, support structure defining an interior space, the support structure formed as an open-ended body comprising an edge defining an opening, the opening configured to receive the load therethrough to fit the open-ended body over the load and receive the load in the interior space, wherein the open-ended body is formed as a flexible box and further comprises a top side extending from an end side, a bottom side extending from the end side oppositely to the top side, a first side extending from the end side between the top and bottom sides, and a second side extending from the end side between the top and bottom sides and oppositely to the first side, wherein the top side, first side, bottom side and second side define the edge,
one or more handles affixed to the support structure,
a flexible, retention strap attached to the support structure and located at and along the edge of the open-ended body, the retention strap arrangeable to form a loop, and
at least one fastener; wherein
said each load lifting device forms an open-ended pocket configured to receive a load therein, the open-ended pocket comprising the interior space of the support structure; wherein
the load lifting system is configured to adopt a working configuration in which a load is received within the open-ended pocket formed by each load lifting device of the at least one load lifting device, and further in which the retention strap of each load lifting device is tightened against the load, and the at least one fastener of each load lifting device maintains the retention strap of said each load lifting device tightened against the load.

2. The load lifting system of claim 1, wherein the at least one load lifting device comprises two load lifting devices, configured to receive different portions of a load.

3. The load lifting system of claim 2, wherein the two load lifting devices are a mirror of each other, and further wherein, in the working configuration of the load lifting system, with the two load lifting devices mounted on different portions of the load, the at least one fastener of one of the load lifting devices and the at least one fastener of the other load lifting device are oriented in a same direction.

4. The load lifting system of claim 1, wherein the retention strap comprises a first end and a free end, and wherein the at least one fastener comprises a releasable buckle affixed to said first end of said retention strap and engageable with said free end of said retention strap to cinch said retention strap tight around the load.

5. The load lifting system of claim 1, wherein the support structure comprises a mesh.

6. The load lifting system of claim 1, wherein the one or more handles are located on the end side of the open-ended body located opposite to the opening.

7. The load lifting system of claim 1, wherein at least one of the top side, bottom side, first side and second side of the open-ended body comprises a mesh.

8. The load lifting system of claim 1, wherein the top side, bottom side, first side and second side of the open-ended body are formed of a mesh.

9. The load lifting system of claim 1, wherein the one or more handles comprise a plurality of handles arranged in at least two different orientations.

10. The load lifting system of claim 9, wherein the plurality of handles comprises a first handle subset consisting of one or more handles arranged in a first orientation, and a second handle subset consisting of one or more handles arranged in a second orientation perpendicular to the first orientation.

11. The load lifting system of claim 10, wherein the plurality of handles further comprises a third handle subset consisting of one or more handles arranged in the first orientation, wherein the second handle subset is arranged between the first handle subset and the third handle subset.

12. The load lifting system of claim 11, wherein the first, second and third handle subsets are located on the end side of the open-ended body located opposite to the opening.

13. The load lifting system of claim 12, wherein the second handle: subset is located at an intermediate area of the end side of the open-ended body.

14. The load lifting system of claim 13, wherein the first handle subset is located at a first edge area of the end side of the open-ended body.

15. The load lifting system of claim 14, wherein the third handle subset is located at a second edge area of the end side of the open-ended body located opposite the first edge area.

16. The load lifting system of claim 1, wherein, in the working configuration of the load lifting system, the support structure is tightened against the load.

17. A load lifting system for safely and securely moving a load, the load lifting system comprising:
at least one load lifting device, each load lifting device comprising:
a flexible, support structure formed as an open-ended body defining an interior space, the support structure comprising an opening configured to receive a load therethrough to fit the open-ended body over the load and receive the load in the interior space,
one or more handles affixed to the support structure on an end side of the open-ended body located opposite to the opening,
a flexible, retention strap attached to the support structure, and located at and along an edge of the open-ended body which defines the opening, the retention strap arrangeable to form a loop, and
at least one fastener; wherein
said each load lifting device forms an open-ended pocket configured to receive a load therein, the open-ended pocket comprising the interior space of the support structure; wherein
the load lifting system is configured to adopt a working configuration in which a load is received within the open-ended pocket formed by each load lifting device of the at least one load lifting device, and further in which the retention strap of each load lifting device is tightened against the load, and the at least one fastener of each load lifting device maintains the retention strap of said each load lifting device tightened against the load.

18. A load lifting system for safely and securely moving a load, the load lifting system comprising:
at least one load lifting device, each load lifting device comprising:

a flexible, support structure formed as an open-ended body defining an interior space, the support structure comprising an opening configured to receive a load therethrough to fit the open-ended body over the load and receive the load in the interior space, a plurality of handles affixed to the support structure on an end side of the open-ended body located opposite to the opening, the plurality of handles comprises a first handle subset consisting of one or more handles arranged in a first orientation, and a second handle subset consisting of one or more handles arranged in a second orientation perpendicular to the first orientation, a flexible, retention strap attached to the support structure, and located at and along an edge of the open-ended body which defines the opening, the retention strap arrangeable to form a loop, and at least one fastener; wherein said each load lifting device forms an open-ended pocket configured to receive a load therein, the open-ended pocket comprising the interior space of the support structure; wherein the load lifting system is configured to adopt a working configuration in which a load is received within the open-ended pocket formed by each load lifting device of the at least one load lifting device, and further in which the retention strap of each load lifting device is tightened against the load, and the at least one fastener of each load lifting device maintains the retention strap of said each load lifting device tightened against the load.

19. A load lifting system for safely and securely moving a load, the load lifting system comprising:

at least one load lifting device, each load lifting device comprising:

a flexible, support structure defining an interior space, a plurality of handles affixed to the support structure, the plurality of handles comprising first, second and third handle subsets, wherein the first handle subset consists of one or more handles arranged in a first orientation, the second handle subset consists of one or more handles arranged in a second orientation perpendicular to the first orientation, and the third handle subset consists of one or more handles arranged in the first orientation, wherein the second handle subset is arranged between the first handle subset and the third handle subset, a flexible, retention strap attached to the support structure, the retention strap arrangeable to form a loop, and at least one fastener; wherein said each load lifting device forms an open-ended pocket configured to receive a load therein, the open-ended pocket comprising the interior space of the support structure; wherein the load lifting system is configured to adopt a working configuration in which a load is received within the open-ended pocket formed by each load lifting device of the at least one load lifting device, and further in which the retention strap of each load lifting device is tightened against the load, and the at least one fastener of each load lifting device maintains the retention strap of said each load lifting device tightened against the load.

20. The load lifting system of claim 19, wherein the support structure is formed as an open-ended body comprising an opening configured to receive the load therethrough to fit the open-ended body over the load and receive the load in the interior space, wherein the retention strap is located at and along an edge of the open-ended body which defines the opening, and further wherein the first, second and third handle subsets are located on an end side of the open-ended body located opposite to the opening.

21. The load lifting system of claim 20, wherein the second handle subset is located at an intermediate area of the end side of the open-ended body.

22. The load lifting system of claim 21, wherein the first handle subset is located at a first edge area of the end side of the open-ended body.

23. The load lifting system of claim 22, wherein the third handle subset is located at a second edge area of the end side of the open-ended body located opposite the first edge area.

* * * * *